3,175,527
ALTITUDE SENSING APPARATUS
Harold W. Deaner, Charlottesville, Va., assignor to Sperry Rand Corporation, Great Neck, N.Y., a corporation of Delaware
Filed Apr. 22, 1963, Ser. No. 274,481
4 Claims. (Cl. 114—66.5)

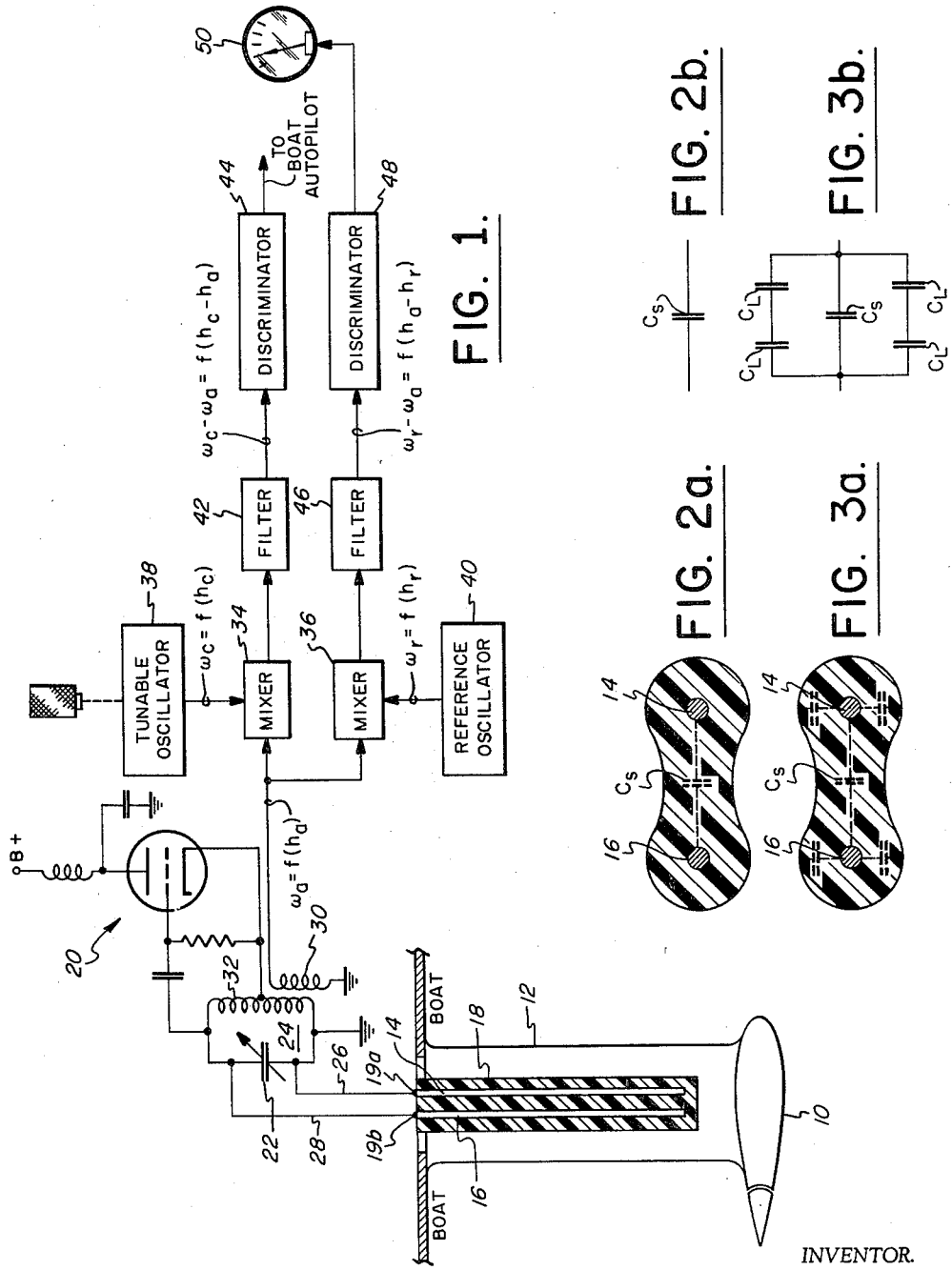
March 30, 1965 — H. W. DEANER — 3,175,527
ALTITUDE SENSING APPARATUS
Filed April 22, 1963
INVENTOR.
HAROLD W. DEANER United States Patent Office 3,175,527
Patented Mar. 30, 1965

This invention relates in general to altitude sensing apparatus and in particular provides apparatus for use in controlling and/or measuring the vertical height that a hydrofoil boat rides above the water.

In providing such apparatus use is made of the fact that parallel conductors when capsulated in electrically nonconductive material, e.g. somewhat like typical television antenna transmision line, have greater capacitance between them when they are immersed in a solution than when not so immersed, this being so whether the solution is conductive or nonconductive.

Generally, with apparatus embodying the invention, capsulated parallel leads are so supported from a hydrofoil boat, e.g. by means of the struts that support the undersea foils of the boat, that they (the leads) pierce the water substantially perpendicular to the water surface. The leads are then electrically connected in parallel with an oscillator tuned circuit, or one of the capacitors in such circuit. Moving the boat vertically out of the water to decrease the immersion of the leads, e.g. as when the boat is driven forwardly, has the effect of decreasing the capacitance in the tuned circuit which, as is known, increases the frequency of oscillation for the oscillator. The frequency at which the oscillator operates is therefore a function of the boat altitude with respect to the water. By comparing the oscillator frequency of oscillation with a reference frequency of oscillation (representing a reference altitude), a signal is produced which has a frequency that is equal to the difference between the aforesaid frequencies of oscillation, such difference frequency being representative of boat altitude with respect to the reference altitude. Should the reference altitude be zero, e.g. as when the vertical displacement of the boat is measured with respect to the surface of the water, the difference frequency will be directly representative of boat height above, or altitude with respect to, the water (a cololary being that the difference frequency will also be representative of the depth that the parallel leads reach into the water).

A principal object of the invention is to provide apparatus for use in controlling the height that a hydrofoil boat rides above the water.

Another object of the invention is to provide apparatus for use in measuring the height that the hull of a hydrofoil boat is above the surface of the water.

Another object of the invention is to provide apparatus for use in the vertical control of a hydrofoil boat.

The invention will be described with reference to the figures wherein:

FIG. 1 is a block diagram, partially schematic in form, depicting a presently preferred embodiment of the invention, FIGS. 2a and 2b are diagrams useful in indicating the capacitance between parallel leads when such leads are not immersed in an electrically conductive solution, and FIGS. 3a and 3b are diagrams useful in describing how the capacitance between parallel leads is made to increase when such leads are immersed in an electrically conductive solution.

Referring to FIG. 1, an undersea foil 10, e.g. as might be employed by a hydrofoil boat of the type shown in U.S. application S.N. 184,836, is shown supported by a strut 12. Running down the length of the strut 12 is a pair of parallel leads 14 and 16 which are electrically insulated from each other by nonconductive material 18, such material everywhere enclosing the leads except near their respective ends 19a and 19b.

An oscillator circuit 20 (in this case a Hartley oscillator) has a capacitor 22 in its tuned circuit 24 connected electrically in parallel with the leads 14 and 16 respectively by means of connecting leads 26 and 28. An output signal is inductively coupled from the oscillator 20 by means of a coil 30 proximate the inductor 32 in the tuned circuit 24, such output signal being applied then to a pair of mixing circuits 34 and 36, each of which may be like the circuit shown in FIGS. 16–22 on page 578 of Electronic and Radio Engineering, Frederick E. Terman, McGraw-Hill Book Company, New York. Applied to the mixing circuit 34 is an output signal from a tunable oscillator 38; applied to the mixing circuit 36 is an output signal from an oscillator 40, the output signal of which is adapted to be invariant in frequency. The oscillator 40 is adapted to provide an output signal having the same frequency as the output signal from the oscillator 20 when the boat in question is not supported by lift provided by its undersea foils, e.g. as when the boat is merely sitting in the water. So too, the oscillator 38 has a rest frequency that equals the frequency of oscillation of the oscillator 40, the oscillator 38 being however so tunable as to be able to change its operating frequency in only one direction with respect to the rest frequency, i.e. the oscillator 38 frequency of oscillation can only be increased, or can only be decreased, with respect to its rest frequency.

In mixing signals, both mixing circuits 34 and 36 produce, as is known, upper and lower sidebands. The mixing circuit 34 applies its output signals to a sharp cutoff filter 42 which is adapted to pass frequencies below the aforesaid rest frequency. Hence, the filter 42 passes only the lower sideband of the output signal from the mixing circuit 34, such passed signal being applied to a frequency demodulator, or discriminator, circut 44. Similarly, the output signal from the mixing circuit 36 is applied through a lower sideband passing filter circuit 46, which may be identical to the filter 42. Like the filter 42, the filter 46 has its output signal applied to a frequency demodulator, or discriminator, circuit 48. The discriminator 44 produces a D.C. signal proportional to the difference between the frequencies at which the oscillators 38 and 20 operate, such D.C. signal being applied to the autopilot for the boat whereby boat altitude with respect to the water is changed until the discriminator 44 has no output signal. The discriminator 48 similarly produces a D.C. signal which is applied to an altitude indicator 50 calibrated in units of altitude, but which in actuality measures the magnitude of the D.C. signal from the discriminator 48.

As the boat rides out of the water and increases its altitude, the capacitance between the parallel leads 14 and 16 decreases, the reason for which will be described later. Because such "decreased" capacitance is in parallel with the capacitance of the capacitor 22, the overall capacitance in the tuned circuit 24 decreases, thereby causing the resonant point for the tuned circuit to increase. This results in the frequency of oscillation for the oscillator 20 (which is hereinafter designated $\omega_a$) being made to increase above the aforesaid rest frequency (hereinafter designated $\omega_r$) as a function of the altitude of the boat above the water, i.e. $\omega_a = f(h_a)$. (The rest frequency may therefore be considered a function of the "rest altitude," i.e. $\omega_r = f(h_a)$, which is the altitude of the boat when it sits in the water.) With signals having the frequencies $\omega_a$ and $\omega_r$ applied to the mixing circuit 36, such circuit produces a plurality of signals among which are the upper and lower sidebands of the mixed signal frequencies. As stated above, the filter 46 is adapted to pass a signal below the aforesaid rest frequency $\omega_r$, which naturally means that the filter 46 passes the lower sideband. (Of course, since as much altitude information is contained in the upper sideband as in the lower sideband, the filter 46 could be adapted to pass only frequencies above the aforesaid rest frequency $\omega_r$.) The output signal from the filter 46 is applied to the discriminator circuit 48 which, for a system adapted to use the lower sideband, may use the aforesaid rest frequency $\omega_r$ as its own reference frequency. (Should the filter 46 be adapted to pass the upper sideband, the discriminator 48 would preferably use twice the rest frequency as its own reference frequency; in this way the discriminator 48 would produce an output signal only when the boat had altitude with respect to the water.) Since the signal frequencies $\omega_r$ and $\omega_a$ are representative of boat altitude respectively when the boat is sitting in the water and when the boat is riding above the water, the output signal from the discriminator 48 is a function of the difference between these two altitudes, the indicator 50 merely indicating the magnitude of such output signal, and as aforesaid is calibrated in units of altitude.

As stated above, the signal frequency $\omega_a$ is representative of the actual boat altitude with respect to the water. Therefore, by providing a signal having a tunable reference frequency, e.g. a command signal frequency $\omega_c$, which here is not a function of a zero altitude as in the case when the boat sits in the water, but of a commanded altitude $h_c$, and applying such reference signal frequency $\omega_c$ to the mixing circuit 34 together with the signal frequency $\omega_a$, sidebands are produced as in the case of the mixing circuit 36, such sidebands here, however, containing information indicative of the error between the actual boat altitude and commanded boat altitude. Application of these sideband signals to the filter 42 results in only the lower sideband being applied to the discriminator 44. (Like the filter 46 and discriminator 48, the filter 42-discriminator 44 combination could be adapted to use of the upper sideband.) The D.C. error signal appearing at the output of the discriminator 44 is then applied to the boat autopilot so that the boat will change altitude to cancel the discrepancy between the actual boat altitude $h_a$ and the commanded boat altitude $h_c$, i.e. the boat changes altitudes to make $\omega_c - \omega_a$ equal zero.

To appreciate why capacitance increases when the leads 14 and 16 are immersed in a conductive solution, e.g. salt water, reference should be had to FIGS. 2a and 2b, and 3a and 3b. FIG. 2a shows the cross sectional area of typical parallel lead transmission line when such line is not immersed in an electrically conductive solution. Here the principal or resultant capacitance between the leads 14 and 16 is shown by a small "dashed" capacitor $C_s$. (FIG. 2b shows such capacitor schematically.) In FIG. 3a, the cross sectional area depicted in FIG. 2a is shown in a conductive bath. Note that in addition to the capacitance $C_s$, serial arrangements of large capacitances $C_L$ are connected in parallel with the capacitance $C_s$. That is, there is appreciable capacitance between the lead 16 and the bath; likewise, there is appreciable capacitance between the lead 14 and the bath. FIG. 3b shows generally how these capacitances add circut-wise to the capacitance $C_s$ to increase the overall capacitance between the leads 14 and 16.

Immersion in a nonconductive solution increases capacitance for a reason different from the reason described above: That is, immersion of insulated leads in a nonconductive medium causes the overall dielectric strength of the medium in the vicinity of the leads to increase, which naturally causes the capacitance between the leads to increase.

Obviously many refinements and changes may be made to the basic apparatus described above. For example, means may be provided to filter the noise-like modulating effect caused by the action of small waves lapping against the strut 12; also the leads 14 and 16 and their capsulating material need not be supported by a strut, but may instead be supported by and within a separate height sensing probe; also, while only two leads 14 and 16 are shown employed, other leads connected in parallel with the leads 14 and 16 may also be adapted to extend into the water to effect frequency modulation of the oscillator 20 output signal.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Altitude control apparatus for use by a hydrofoil boat when said boat is in the water comprising an oscillater adapted to produce an output signal, said oscillator having a tunable resonant circuit that regulates the frequency of oscillation for said oscillator, and said circuit having at least one capacitor therein, a pair of substantially straight electrically conductive leads in substantially parallel spaced apart relationship being each connected electrically to a different side of one of the capacitors in the resonant circuit, means for assuring that said leads are always electrically insulated from each other, said last named means preventing foreign bodies from coming between said leads, means for producing a signal having a reference frequency representative of a reference altitude for said boat, means for comparing the frequency of the last-named signal with the frequency of the output signal from said oscillator to produce a signal having a frequency that is equal to the difference between the compared frequencies, and means so supporting said leads from said boat that they are substantially perpendicular to the surface of the water and at least partially locate within the water, whereby changes in the altitude of said boat cause the oscillator frequency of oscillation to change to cause thereby said difference frequency to change, and whereby the frequency of said difference frequency is a measure of the altitude of said boat with respect to the reference altitude.

2. The apparatus of claim 1 wherein said means for producing a signal having a reference frequency produces a signal representing a zero altitude for said boat, said apparatus further including frequency responsive indicator means calibrated in units of altitude and adapted to measure the frequency of said difference frequency.

3. The apparatus of claim 1 wherein said means for producing a signal having a reference frequency is tunable, said means being thereby adapted to provide signals over a range of altitude representative reference frequencies, said apparatus further including frequency responsive autopilot means for said boat, said autopilot means being responsive to the signal having said difference frequency to change the altitude of said boat to cancel said difference frequency, whereby the craft acquires the altitude represented by the frequency of the signal provided by said means for producing a signal having a reference frequency.

4. Altitude control apparatus for use by a hydrofoil boat when said boat is in the water comprising oscillator means for producing an output signal, said means having a parallel tuned circuit that regulates the frequency of oscillation for said oscillator means, a pair of substantially parallel straight electrically conductive leads in substantially parallel spaced apart relationship being each connected electrically to a different side of a capacitor in the tuned circuit, means so supporting said leads from said boat that they at least partially locate within the water, means for assuring that said leads are always electrically insulated from each other, said last named means preventing foreign bodies from coming between said leads, means for producing a signal having a reference frequency, said reference frequency being representative of a reference altitude for said boat, and frequency discrimination means receiving the last-named signal and the output signal from said oscillator means to produce a signal proportional to the difference between the frequencies of the signals applied to said frequency discrimination means, whereby changes in the altitude of said boat cause the frequency of oscillation of said oscillator means to change, and whereby the output signal from said frequency discrimination means is a measure of the altitude of said boat with respect to the reference altitude.

References Cited by the Examiner
UNITED STATES PATENTS

| | | | |
|---|---|---|---|
| 2,576,716 | 11/51 | Gardiner | 114—66.5 |
| 2,696,796 | 12/54 | Amster | 114—66.5 |
| 2,852,937 | 9/58 | Maze | 73—304 |
| 3,028,548 | 4/62 | Breen | 324—61 |
| 3,051,000 | 8/52 | Keller | 114—66.5 |

FERGUS S. MIDDLETON, *Primary Examiner.*